US010402887B2

(12) United States Patent
Mohiuddin et al.

(10) Patent No.: US 10,402,887 B2
(45) Date of Patent: Sep. 3, 2019

(54) SYSTEMS AND METHODS OF PRODUCT INTERACTION RECOGNITION USING SENSORS WITHIN A TAG

(71) Applicants: Mohammad Mohiuddin, Boynton Beach, FL (US); Hubert A. Patterson, Boca Raton, FL (US); Melwyn F. Sequeira, Plantation, FL (US)

(72) Inventors: Mohammad Mohiuddin, Boynton Beach, FL (US); Hubert A. Patterson, Boca Raton, FL (US); Melwyn F. Sequeira, Plantation, FL (US)

(73) Assignee: Tyco Fire & Security GmbH, Rheinfall (CH)

( * ) Notice: Subject to any disclaimer, the term of this patent is extended or adjusted under 35 U.S.C. 154(b) by 283 days.

(21) Appl. No.: 15/400,675

(22) Filed: Jan. 6, 2017

(65) Prior Publication Data

US 2018/0197225 A1 Jul. 12, 2018

(51) Int. Cl.
*G06Q 30/00* (2012.01)
*G06Q 30/06* (2012.01)
(Continued)

(52) U.S. Cl.
CPC ........... *G06Q 30/0631* (2013.01); *G06K 1/00* (2013.01); *G06Q 10/00* (2013.01); *G06Q 10/087* (2013.01);
(Continued)

(58) Field of Classification Search
CPC .. G06Q 30/0631; G06Q 10/087; G06Q 10/00; G06Q 10/08; G06Q 10/1087;
(Continued)

(56) References Cited

U.S. PATENT DOCUMENTS 6,703,934 B1 * 3/2004 Nijman .................. G06Q 30/06 235/383
8,094,026 B1 * 1/2012 Green ............. G08B 13/19697 235/375
(Continued)

FOREIGN PATENT DOCUMENTS

CN 202134042 U * 2/2012 ............. G06Q 10/00
CN 103530585 A * 1/2014 ............... G06K 7/00
WO WO-2017060824 A1 * 4/2017 ......... G06Q 10/0833

OTHER PUBLICATIONS

Article, "The value of handhelds in smart environments" to Siegemund, F., Floerkemeier, C. & Vogt, H.; published in Personal and Ubiquitous Computing; Mar. 2005, vol. 9, Issue 2 pp. 69-80—Original Article First Onine:Oct. 6, 2004; extracted from Proquest Dialog on Dec. 7, 2018.*

*Primary Examiner* — Yogesh C Garg
(74) *Attorney, Agent, or Firm* — Fox Rothschild LLP; Robert J. Sacco; Carol E. Thorstad-Forsyth

(57) ABSTRACT

Systems and methods for managing inventory. The methods comprise: generating sensor data by an Electronic Smart Tag ("EST"); processing, by the EST or a computing device remote from the EST, the sensor data to transform the same into information specifying at least one of a first person's intention with regard to an item to which the EST is coupled and the first person's interest in the item; generating a notification or a recommendation relating to inventory management, based on at least one of the first person's intention with regard to the item and the first person's interest in the item; and providing the notification or recommendation to a second person.

14 Claims, 7 Drawing Sheets

(51) Int. Cl.

| | |
|---|---|
| ***G06Q 10/08*** | (2012.01) |
| ***G08B 13/24*** | (2006.01) |
| ***G07C 9/00*** | (2006.01) |
| ***G06K 1/00*** | (2006.01) |
| ***G06Q 10/00*** | (2012.01) |

(52) U.S. Cl.
CPC ........... *G07C 9/00* (2013.01); *G08B 13/2402* (2013.01); *G08B 13/248* (2013.01); *G08B 13/2451* (2013.01); *G08B 13/2462* (2013.01); *G08B 13/2465* (2013.01)

(58) Field of Classification Search
CPC ............. G06K 1/00; G06K 2017/0051; G08B 13/2402; G08B 13/2451; G08B 13/2462; G08B 13/2465; G08B 13/248; G07C 9/00
USPC .................................................. 705/26.7, 28
See application file for complete search history.

(56) References Cited

U.S. PATENT DOCUMENTS

| | | | | |
|---|---|---|---|---|
| 9,030,295 | B2 * | 5/2015 | Allen | G06Q 10/08 340/10.1 |
| 2010/0090809 | A1 * | 4/2010 | Yeo | G06K 19/0717 340/10.41 |
| 2012/0116590 | A1 * | 5/2012 | Florez-Larrahondo | G06F 1/206 700/275 |
| 2014/0224867 | A1 * | 8/2014 | Werner | H04W 4/80 235/375 |
| 2016/0021512 | A1 * | 1/2016 | Krallman | H04W 4/04 455/456.3 |
| 2017/0185957 | A1 * | 6/2017 | Kilmer | H04Q 9/00 |
| 2017/0224588 | A1 * | 8/2017 | Kitson | G06F 19/3462 |

* cited by examiner

SYSTEMS AND METHODS OF PRODUCT INTERACTION RECOGNITION USING SENSORS WITHIN A TAG

BACKGROUND

Statement of the Technical Field

The present disclosure concerns generally to inventory systems. More particularly, the present invention relates to implementing systems and methods for providing product interaction recognition using sensors within a tag.

Description of the Related Art

Merchandise manufacturers like to know about consumer interest in their merchandise so they can improve the product and sell more items. In this regard, retail store managers and owners have a desire to learn which items are selling fastest and how customers interact with items in real time. Currently, there is no way to understand how customers view and interact with an item before making a decision whether or not to purchase the same.

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an acousto-magnetic element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

One type of EAS security tag can include a tag body which engages a tack. The tack usually includes a tack head and a sharpened pin extending from the tack head. In use, the pin is inserted through the article to be protected. The shank or lower part of the pin is then locked within a cooperating aperture formed through the housing of the tag body. In some scenarios, the tag body may contain a Radio Frequency Identification ("RFID") element or label. The RFID element can be interrogated by an RFID reader to obtain RFID data therefrom.

The EAS security tag may be removed or detached from the article using a detaching unit. Examples of such detaching units are disclosed in U.S. Patent Publication No. 2014/0208559 ("the '559 patent application) and U.S. Pat. No. 7,391,327 ("the '327 patent"). The detaching units disclosed in the listed patents are designed to operate upon a two-part hard EAS security tag. Such an EAS security tag comprises a pin and a molded plastic enclosure housing EAS marker elements. During operation, the pin is inserted through an article to be protected (e.g., a piece of clothing) and into an aperture formed through at least one sidewall of the molded plastic enclosure. The pin is securely coupled to the molded plastic enclosure via a clamp disposed therein. The pin is released by a detaching unit via application of a magnetic field by a magnet or mechanical probe inserted through an aperture in the hard tag. The magnet or mechanical probe is normally in a non-detach position within the detaching unit. When the RFID enabled hard tag is inserted into the RFID detacher nest, a first magnetic field or mechanical clamp is applied to hold the tag in place while the POS transaction is verified. Once the transaction and payment have been verified, the second magnet or the mechanical probe is caused to travel from the non-detach position to a detach position so as to release the tag's locking mechanism (e.g., a clamp). The pin can now be removed from the tag. Once the pin is removed and the article is released, the security tag will be ejected or unclamped from the detacher nest.

SUMMARY

The present invention concerns implementing systems and methods for managing inventory. The methods comprise: generating sensor data by an Electronic Smart Tag ("EST"); processing, by the EST or a computing device remote from the EST, the sensor data to transform the same into information specifying at least one of a first person's (e.g., a customer's) intention with regard to an item to which the EST is coupled (e.g., tampering, steeling, or purchasing) and the first person's interest in the item; generating a notification or a recommendation relating to inventory management, based on at least one of the first person's intention with regard to the item and the first person's interest in the item; and providing the notification or recommendation to a second person (e.g., an employee or security personnel).

In some scenarios, the sensor data specifies at least one of the EST's movement, a surrounding environment's characteristic, and audio content of the surrounding environment. The surrounding environment's characteristic comprises light, moisture or heat. The audio content comprises at least one of speech and sound. The notification comprises a notification of a possible tampering or theft, a notification of a possible need for customer service, and a notification of a possible faulty operation of the item. The recommendation comprises a recommendation for relocating the item, a redesign of the item's packaging or an improvement of a feature of the item.

The present document also relates to ESTs couplable to an inventory item. The ESTs each comprise: at least one sensor generating sensor data; a processor (e.g., a controller); and a non-transitory computer-readable storage medium comprising programming instructions that are configured to cause the processor to implement a method for inventory management. The programming instructions comprise instructions to: process the sensor data to transform the same into information specifying at least one of a first person's intention with regard to the inventory item to which the EST is coupled and the first person's interest in the inventory item; cause a notification or a recommendation relating to inventory management to be generated based on at least one of the first person's intention with regard to the inventory item and the first person's interest in the inventory item; and cause the notification or recommendation to be provided to a second person.

In some scenarios, the sensor data specifies at least one of the EST's movement, a surrounding environment's characteristic, and audio content of the surrounding environment. The notification comprises a notification of a possible tampering or theft, a notification of a possible need for customer service, and a notification of a possible faulty operation of the item. The recommendation comprises a recommendation for relocating the item, a redesign of the item's packaging or an improvement of a feature of the item.

The present document also concerns implementing systems as noted above. Some implementing systems comprise: an EST coupled to an inventory item and generating sensor data; and a computing device remote from the EST. The computing device has a non-transitory computer-readable storage medium comprising programming instructions that are configured to cause the computing device to implement a method for inventory management. The programming instructions comprise instructions to: obtain the sensor data from the EST; process the sensor data to transform the same into information specifying at least one of a first person's intention with regard to an item to which the EST is coupled and the first person's interest in the item; generate a notification or a recommendation relating to inventory management, based on at least one of the first person's intention with regard to the item and the first person's interest in the item; and cause a provision of the notification or recommendation to a second person.

BRIEF DESCRIPTION OF THE DRAWINGS

Embodiments will be described with reference to the following drawing figures, in which like numerals represent like items throughout the figures.

DETAILED DESCRIPTION

Figure 1:
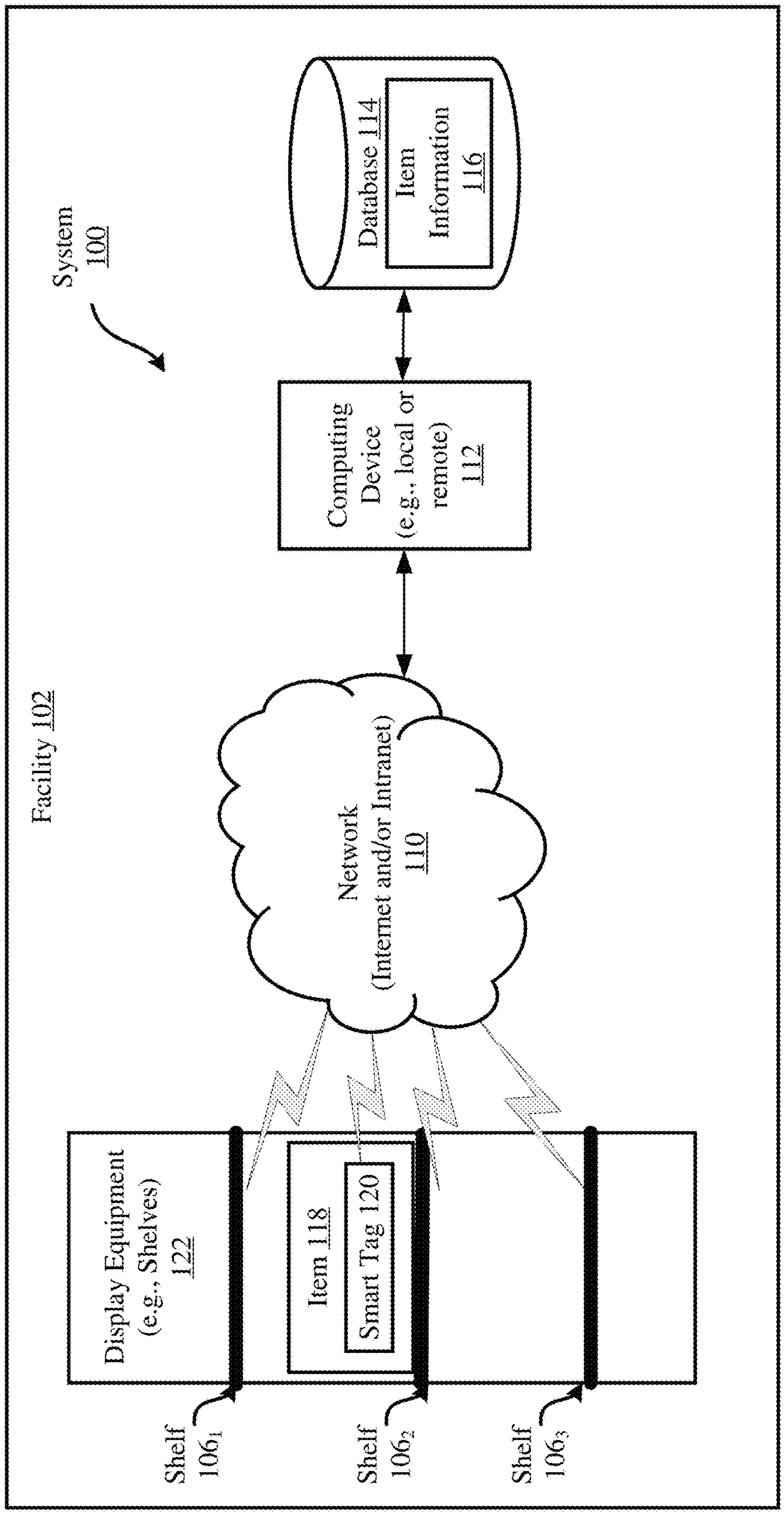
FIG. 1 is an illustration of an exemplary system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns systems and methods for providing real time information about a person's intention and interest level in an item. By incorporating power and electronics, a tag can be converted into a smart tag. The electronics can include, but are not limited to, a microprocessor, an energy management system, an Inertial Measurement Unit ("IMU"), audio unit and/or environmental sensors. The IMU, audio unit and/or environmental sensors can provide insight about how an item is handled by customers and other people. When a person handles the item, three dimensional ("3D") motion vector data, audio data and/or environmental sensor data is generated by the smart tag. This 3D motion vector data, audio data (e.g., spoken words/phrase and/or sounds made in proximity to the item being handled), and/or environmental sensor data provides information about the person's intention and interest level in the item.

Referring now to FIG. 1, there is provided an illustration of an exemplary system 100. System 100 is entirely or at least partially disposed within a facility 102. The facility 102 can include, but is not limited to, a retail store facility.

As shown in FIG. 1, at least one item 118 (e.g., a box of cereal or a piece of clothing) resides within the facility 102. The item 118 has an EST 120 coupled thereto. This coupling is achieved via an adhesive (e.g., glue), a mechanical coupler (e.g., straps, clamps, snaps, etc.), a weld, chemical bond or other means. The EST 120 is generally configured to provide information about a person's intention and interest level in the item 118. The EST 120 will be described in detail below in relation to FIG. 2. However, at this time, it should be noted that the EST 120 generates 3D motion vector data, audio data and/or environmental sensor data which is useful in understanding the person's intention with regard to the item and/or the person's interest level in the item 118. The item 118 is disposed on display equipment 122 so as to be accessible to people (e.g., customers). The display equipment includes, but is not limited to, shelves 1061-1063, display cabinets (not shown), and/or exhibit cases (not shown).

The EST 120 comprises wireless communication components that enable the communication of information 116 thereto and/or therefrom. The information includes, but is not limited to, 3D motion vector data, audio data, time stamp data, unique identifiers, and/or location data. Information is provided to the computing device from the EST via a network 110 (e.g., the Internet and/or Intranet). The computing device 112 can be local to the facility 102 as shown in FIG. 1 or remote from the facility 102. The computing device 112 will be described in detail below in relation to FIG. 3. However, at this time, it should be understood that the computing device 112 is configured to: obtain audio data, sensor data, time stamps, unique identifiers and/or location data from the EST 120; perform an analysis of some or all of the data received from the EST 120; and/or write data to and read data from a database 114. The data analysis is performed to: identify relevant and irrelevant movements of the item 118; determine the extent and type of the relevant movements of the item 118; and/or a conversion rate of items of the type being moved. The computing device 112 then uses the results of the data analysis to generate a notification to store personnel and/or derive a recommendation for improving product packaging, product characteristics (e.g., esthetics), and/or a product conversion rate. For example, the computing device 112 provides a notification to store personnel that customer service is needed on a particular isle in relation to a given product. The computing device 112 may alternatively and/or additionally provide a recommendation that the item's packaging needs to be modified to include additional information, the item's aesthetics need to be improved, and/or the item's display location within the facility 102 needs to be changed. The present solution is not limited to the particulars of this example.

Figure 2:
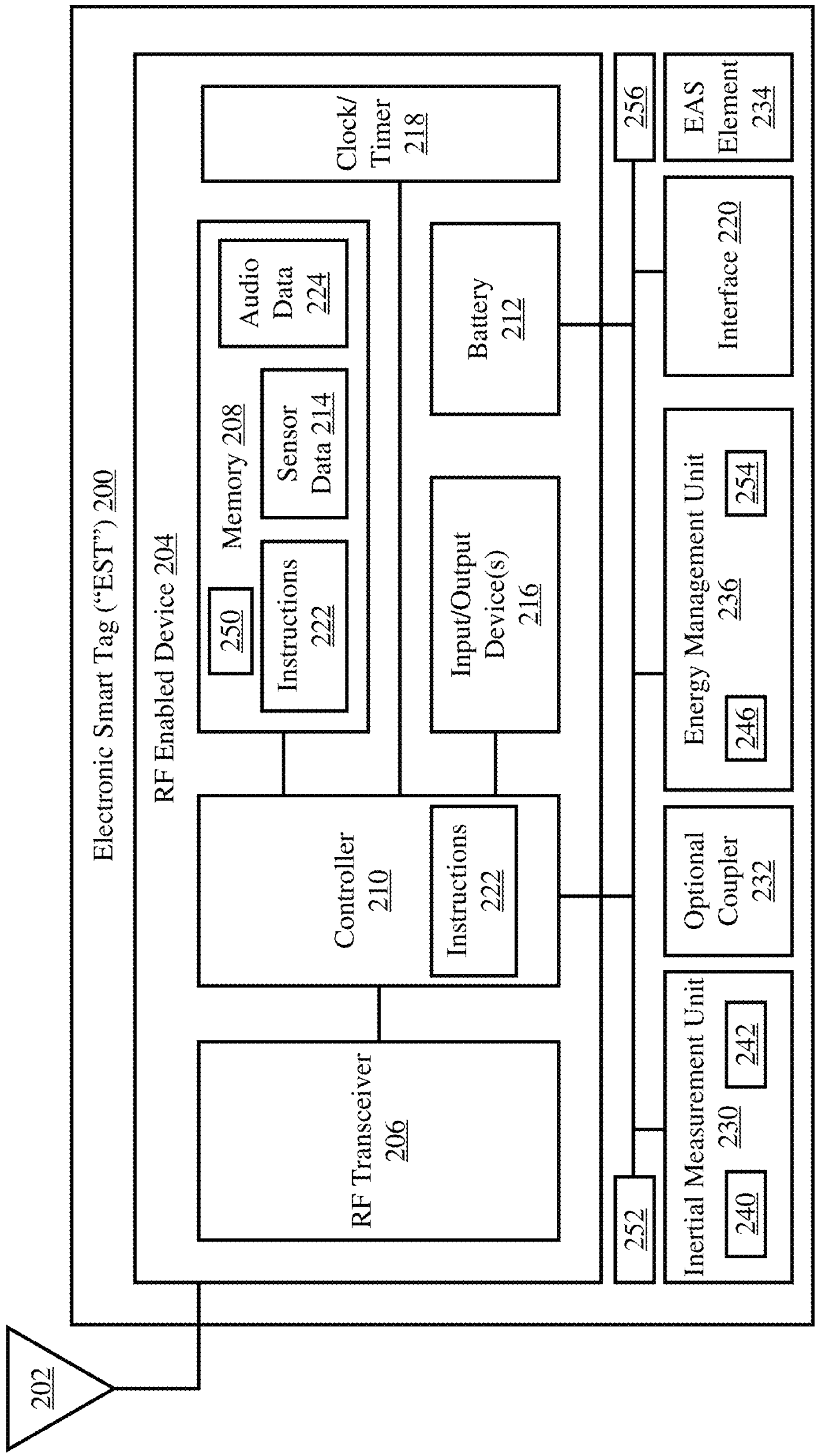
FIG. 2 is an illustration of an exemplary architecture for an electronic smart tag.

Referring now to FIG. 2, there is provided an illustration of an exemplary architecture for an EST 200. EST 120 of FIG. 1 is the same as or substantially similar to EST 200. As such, the discussion of EST 200 is sufficient for understanding the EST 120 of FIG. 1.

The EST 200 can include more or less components than that shown in FIG. 2. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative EST 200 configured to facilitate improved inventory management and inventory conversion rates. In this regard, the EST 200 is configured for allowing data to be exchanged with an external device (e.g., computing device 112 of FIG. 1) via wireless communication technology. The wireless communication technology can include, but is not limited to, Radio Frequency ("RF") communication technology. RF communication technology is well known in the art, and therefore will not be described in detail herein. Any known or to be known RF communication technology or other wireless communication technology can be used herein without limitation.

The components 206-218 shown in FIG. 2 may be collectively referred to herein as the RFID enabled device 204, and include a power source 212 (e.g., a battery), a memory 208 and a clock/timer 218. Memory 204 may be a volatile memory and/or a non-volatile memory. For example, the memory 204 can include, but is not limited to, Random Access Memory ("RAM"), Dynamic RAM ("DRAM"), Static RAM ("SRAM"), Read Only Memory ("ROM") and flash memory. The memory 204 may also comprise unsecure memory and/or secure memory.

The RFID enabled device 204 comprises an antenna 202 for allowing data to be exchanged with the external device via RFID technology. The antenna 202 is configured to receive RFID signals from the external device and/or transmit RFID signals generated by the RFID enabled device 204. In some scenarios, the antenna 202 comprises a low-power near-field antenna. The low-power near-field antenna includes, but is not limited to, a chip antenna or a loop antenna.

The RFID enabled device 204 also comprises an RF transceiver 206. RF transceivers are well known in the art, and therefore will not be described herein. However, it should be understood that the RF transceiver 206 generates and transmits RF carrier signals to external devices, as well as receives RF signals transmitted from external devices. In this way, the RFID enabled device 204 facilitates the registration, identification, classification, locating and/or tracking of an item's movements (e.g., item 118 of FIG. 1) to which the EST 200 is coupled. The RFID enabled device 204 also facilitates the automatic communication of audio data, sensor data, time stamp data and/or unique identifier(s) from the EST 200 at pre-specified times and/or in response to certain trigger events. The trigger events can include, but are not limited to, the expiration of a given time period, the detection of EST movement for a given period of time, the detection of concurrent EST's movement and sound generation in proximity to the EST, and/or receipt of an interrogation signal or data request signal from an external device (e.g., computing device 112 of FIG. 1).

Sensor data 214, audio data 224 and/or other data 250 associated with the identification and/or location of the EST 200 is stored in memory 208 of the RFID enabled device 204 and/or communicated to other external devices (e.g., computing device 112 of FIG. 1) via RF transceiver 206 and/or interface 220 (e.g., an Internet Protocol or cellular network interface). For example, the RFID enabled device 204 can communicate information specifying a timestamp, a unique identifier, location information, sensor data and/or audio data to an external computing device. The external computing device (e.g., server) can then store the information in a database (e.g., database 114 of FIG. 1) and/or use the information during data analysis operations for improving product security, customer service, product packaging, product characteristics (e.g., esthetics), and/or a product conversion rate.

The RFID enabled device 204 also comprises a controller 210 and input/output devices 216. The controller 210 can also execute instructions 222 implementing methods for facilitating improved inventory management and/or product conversion rates. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the EST 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the EST 200 and that cause the EST 200 to perform any one or more of the methodologies of the present disclosure.

The input/output devices can include, but are not limited to, a display (e.g., an E Ink display or an LCD display), a speaker, a microphone and/or light emitting diodes. The display is used to present item level information in a textual format and/or graphical format. Similarly, the speaker may be used to output alarms and/or item level information in an auditory format. The speaker and/or light emitting diodes may be used to output alerts for drawing a person's attention to the EST 200 and/or for notifying the person of a particular pricing status (e.g., on sale status) of the item to which the EST is coupled. The microphone may be used to record sounds being made in proximity to the EST 200. The sounds can be continuously recorded. Alternatively, the sounds are recorded in response to trigger events and/or for a pre-defined period of time after the trigger event. The trigger events can include, but are not limited to, movement of the EST and/or the detection of a person in proximity to the EST 200. The recording of sounds can be terminated when the EST's movement stops and/or the person is no longer in proximity to the EST 200.

The EST 200 also comprises a proximity sensor 252 and/or a clock/timer 218. The proximity sensor 252 is configured to detect when a person is in proximity to the EST 200. The clock/timer 218 is configured to determine a date, a time, and/or an expiration of a pre-defined period of time. Techniques for determining these listed items are well known in the art, and therefore will not be described herein. Any known or to be known technique for determining these listed items can be used herein without limitation.

The EST 200 further comprises an IMU 230 and an energy management unit 236. The IMU 230 is configured to collect sensor data relating to the movements of the EST 200. In this regard, the IMU 230 can include, but is not limited to, a gyroscope 240, an accelerometer 242 and/or other motion sensor. Gyroscopes and accelerometers are well known in the art, and therefore will not be described herein. Any known or to be known gyroscope, accelerometer or other motion sensor can be used herein without limitation.

The energy management unit 236 is configured to generate power and/or manage the supply of power to the various components within the EST 200. In this regard, the energy management unit 236 may comprise an energy harvesting circuit 246. The energy harvesting circuit 246 is configured to derive energy from external sources and store the energy in a super capacitor 254 for later use. The energy can be harvested from ambient vibrations, radiation (e.g., broadcast RF energy), heat and/or light. The energy management unit 236 monitors the battery's 212 and super capacitor's 254 state of charge, and causes power to be supplied to the EST components therefrom based on their states of charge. In some scenarios, the battery may be recharged via the energy harvesting circuit 246 and/or switches (not shown) may be provided for controlling the closing and/or opening of electrical connections between the EST components and the power sources 212, 254.

The optional coupler 232 is provided to securely or removably couple the EST 200 to an item (e.g., item 118 of FIG. 1). The coupler 232 includes, but is not limited to, a mechanical coupling means (e.g., a strap, clip, clamp, snap) and/or an adhesive (e.g., glue or sticker). The coupler 232 is optional since the coupling can be achieved via a weld and/or chemical bond.

An optional EAS element may be disposed in the EST 200 for facilitating product security via an EAS tag detection system. EAS elements are well known in the art, and therefore will not be described herein. Any known or to be known EAS element can be used herein without limitation. When the EST comprises an EAS element, it may be referred to as an EAS security tag with smart device functionality. During operation, the EAS security tag is coupled to an item prior to when the item is placed on a store floor as an item offered for sale, rent or loan. The EAS security tag provides physical security for the item. When the item is successfully purchased, a store clerk removes the EAS security tag or disables the EAS security tag in order to stop the EAS tag detection system (e.g., at the retail store's exit) from sounding an alarm when the purchaser or other approved person travel's through an interrogation (or surveillance) zone with the item.

Figure 3:
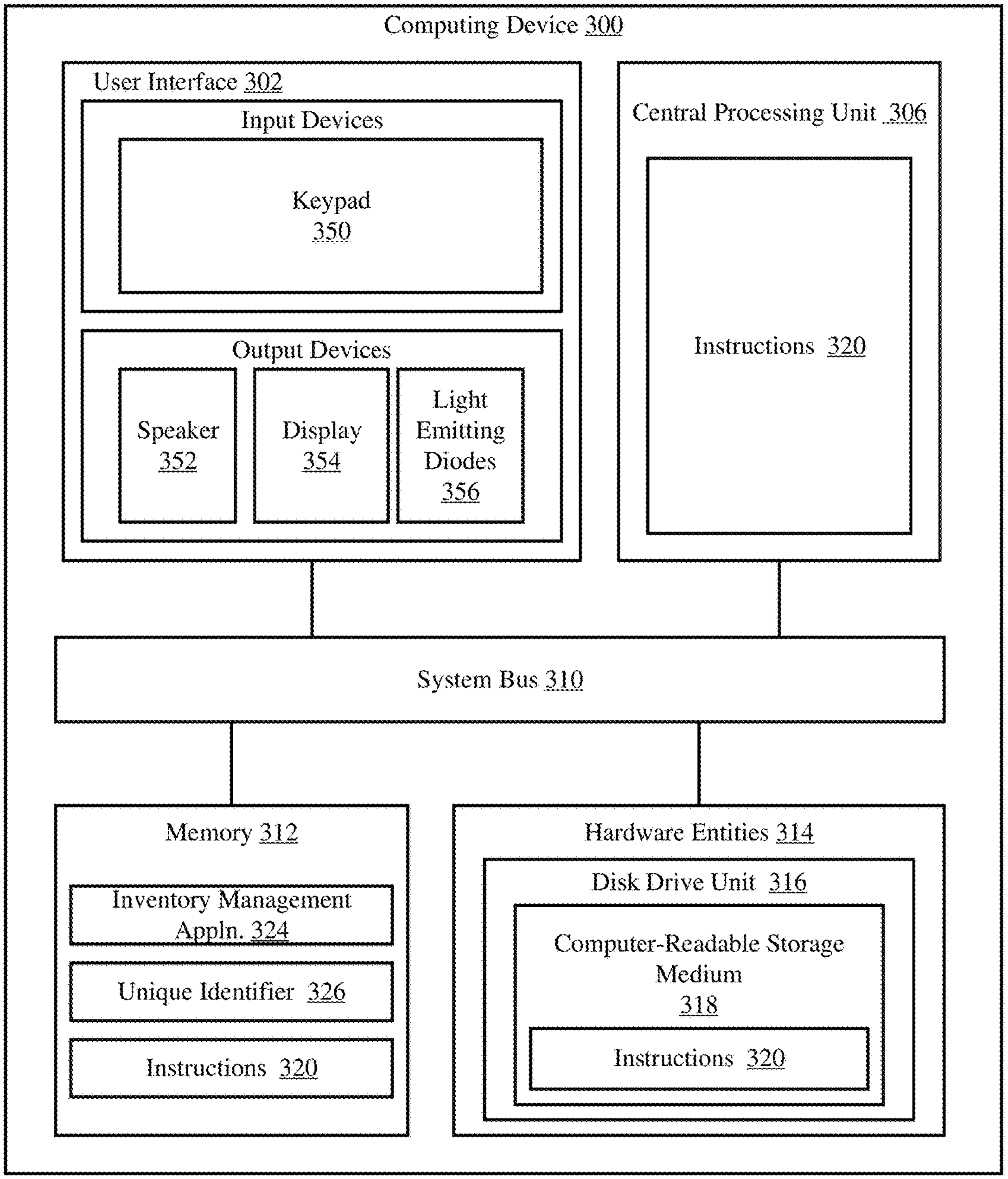
FIG. 3 is an illustration of an exemplary architecture for a computing device (e.g., server).

Referring now to FIG. 3, there is provided a detailed block diagram of an exemplary architecture for a computing device 300. Computing device 112 of FIG. 1 is the same as or substantially similar to computing device 300. As such, the following discussion of computing device 300 is sufficient for understanding computing device 112.

Computing device 300 may include more or less components than those shown in FIG. 3. However, the components shown are sufficient to disclose an illustrative embodiment implementing the present solution. The hardware architecture of FIG. 3 represents one embodiment of a representative computing device configured to facilitate improved inventory management and product conversion rates. As such, the computing device 300 of FIG. 3 implements at least a portion of a method for improving inventory management and/or product conversion rates in accordance with the present solution.

Some or all the components of the computing device 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 300 comprises a user interface 302, a Central Processing Unit ("CPU") 306, a system bus 310, a memory 312 connected to and accessible by other portions of computing device 300 through system bus 310, and hardware entities 314 connected to system bus 310. The user interface can include input devices (e.g., a keypad 350) and output devices (e.g., speaker 352, a display 354, and/or light emitting diodes 356), which facilitate user-software interactions for controlling operations of the computing device 300.

At least some of the hardware entities 314 perform actions involving access to and use of memory 312, which can be a RAM, a disk driver and/or a Compact Disc Read Only Memory ("CD-ROM"). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 300. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 300 and that cause the computing device 300 to perform any one or more of the methodologies of the present disclosure.

In some scenarios, the hardware entities 314 include an electronic circuit (e.g., a processor) programmed for facilitating improved inventory management and product conversion rates. In this regard, it should be understood that the electronic circuit can access and run an inventory management application 324 installed on the computing device 300. The software application 324 is generally operative to: perform an analysis of the audio data, sensor data, time stamp data, location data and/or unique identifier data received from the EST 120; and/or facilitate the writing of data to and/or the reading of data from a database 114. The data analysis involves: analyzing data received from an EST to identify relevant and irrelevant movements of the item 118; determining the extent and type of the relevant movements of the item 118; and/or determining a conversion rate of items of the type being moved. The software application 324 then uses the results of the data analysis to generate a notification to store personnel and/or derive a recommendation for improving product security, customer service, product packaging, product characteristics (e.g., esthetics), and/or product conversion rate. Other functions of the software application 324 will become apparent as the discussion progresses.

Figure 4A:
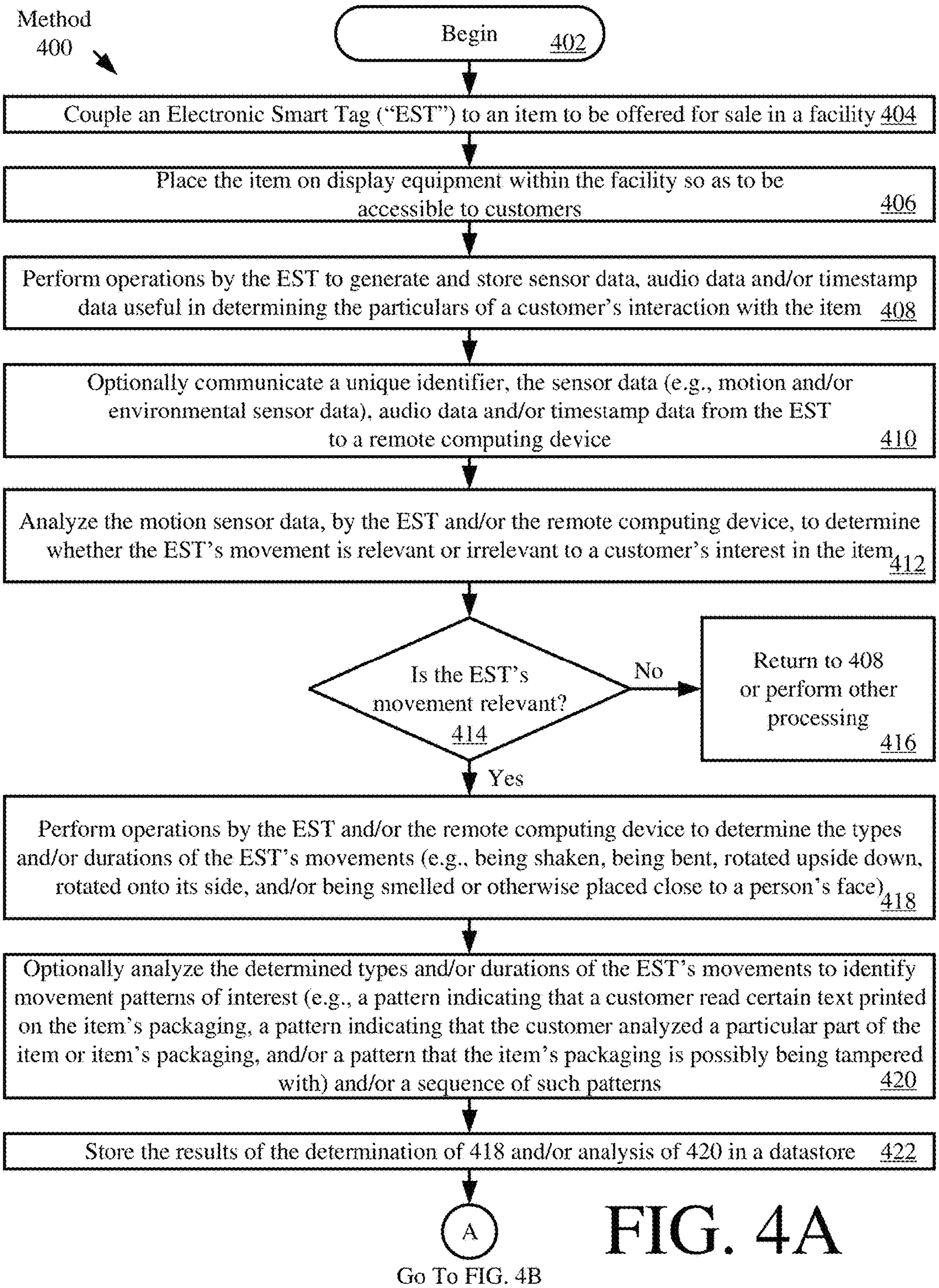
FIGS. 4A-4C (collectively referred to as "FIG. 4") provide a flow diagram of an exemplary method for managing inventory and/or improving product conversion rates.

Referring now to FIG. 4, there is provided a flow diagram of an exemplary method 400 for managing inventory and/or improving product conversion rates. Method 400 begins with 402 and continues with 404 where an EST (e.g., EST 120 of FIG. 1) is coupled to an item (e.g., item 118 of FIG. 1) that is to be offered for sale, rent or loan in a facility (e.g., facility 102 of FIG. 1). In 406, the item is placed on display equipment (e.g., display equipment 122 of FIG. 1) so as to be accessible to customers.

While the item is present on the facility's sales floor, a customer may handle the item before making a decision to purchase, rent or loan the same. The way the customer interacts with the item is captured by the EST in 408. In this regard, the EST performs operations to generate and store sensor data, audio data and/or timestamp data that is useful in determining the particulars of the customer's interaction with the item. The sensor data is acquired using motion sensors (e.g., sensors 240, 242 of FIG. 2) and/or environmental sensors (e.g., sensors 256 of FIG. 2) of the EST. The audio data is acquired using a microphone (e.g., input device 216 of FIG. 2) of the EST. The audio data specifies captured sounds made in proximity to the EST and/or speech spoken in proximity to the EST. The timestamp data is acquired using a clock/timer (e.g., clock/timer 218 of FIG. 2) of the EST. The timestamp data can be used to assist in time synchronizing the sensor data and/or the audio data.

In some scenarios, the sensor data and/or audio data is continuously acquired. In other scenarios, the sensor data and/or audio data is acquired in response to a trigger event. The sensor data acquisition and the audio data acquisition can be triggered in response to the same or different trigger events. The trigger events can include, but are not limited to, a detection of EST movement, a detection of a person in proximity to the EST, a detection of increased light in a surrounding environment, a detection of an increased amount of heat in proximity to the EST, reception of a signal from a mobile device in proximity to the EST, and/or an expiration of a period of time. Some or all of these trigger events can be detected by the EST and/or a device external to the EST.

In some scenarios, the data is analyzed by the EST. In this case, method 400 continues with 412. In other scenarios, the data is additionally or alternatively analyzed by a remote computing device (e.g., computing device 112 of FIG. 1 or computing device 300 of FIG. 3). Accordingly, the EST can communicate a unique identifier, the sensor data, the audio data, the timestamp data and/or location data to the remote computing device as shown by 410. This communication can be achieved via wireless communications (e.g., RF communications and/or WiFi communications).

The analysis of motion sensor data is performed in 412 to determine whether the EST's movement is relevant or irrelevant to a customer's interest in the item. The motion sensor data can include, but is not limited to, gyroscope data and/or accelerometer data. The motion sensor data can be formatted as 3D motion vector data. A determination that the EST's movement is irrelevant can be made if the motion sensor data indicates that the item is simply vibrating (e.g., such as when the display equipment on which the item is disposed is being moved from a first location to a second location in a retail store). A determination that the EST's movement is relevant can be made if the motion sensor data indicates that the item is being held and/or manipulated by a person (e.g., its altitude and/or orientation changes). In some scenarios, this determination can also involve obtaining employee information from a database (e.g., database 114 of FIG. 1) indicating that a store employee was not in proximity of the EST when the item was being moved. Accordingly, a determination that the EST's movement is relevant can be made if (A) the motion sensor data indicates that the item is being held and/or manipulated by a person and (B) the employee information indicates that the person having possession of the EST is a person other than a store employee.

The present solution is not limited to the above-described technique for determining if the person is or is not a store employee. Other techniques can be employed. For example, the EST may be configured to obtain a unique identifier from a mobile device in proximity thereto (e.g., a smart phone in the person's possession) and communicate the same to the remote computing device. The remote computing device compares the unique identifier to a plurality of pre-stored unique identifiers to detect a match therebetween. Information is stored in association with the matching pre-stored unique identifier which indicates the person's identity.

If a determination is made that the EST's movement is irrelevant [414:NO], then method 400 returns to 408 or other processing is performed as shown by 416. In contrast, if a determination is made that the EST's movement is relevant [414:YES], then method 400 continues with 418. In 418, the EST and/or the remote computing device perform operations to determine the types and/or durations of the EST's movements (e.g., being shaken, being bent, rotated upside down, rotated onto its side, and/or being smelled or otherwise placed close to a person's face). Techniques for determining types of motion and/or movements are well known in the art, and will not be described herein. Any known or to be known technique for determining types of motion and/or movements can be used herein without limitation.

Next in optional 420, the determined types and/or durations of the EST's movements are analyzed to identify movement patterns of interest (e.g., a pattern indicating that a customer read certain text printed on the item's packaging, a pattern indicating that the customer analyzed a particular part of the item or item's packaging, and/or a pattern that the item's packaging is possibly being tampered with) and/or a sequence of such patterns. The movement patterns of interest can be identified by detecting matches and/or similarities between the motion sensor data and reference movement patterns. The results of the analysis are stored in a datastore (e.g., memory 208 of FIG. 2 and/or database 114 of FIG. 1), as shown by 422. In some scenarios, at least one symbol is stored in the datastore indicating the results of the data analysis. The symbol can include at least one numerical symbol, at least one alphabetic symbol and/or graphical symbol.

Figure 4B:
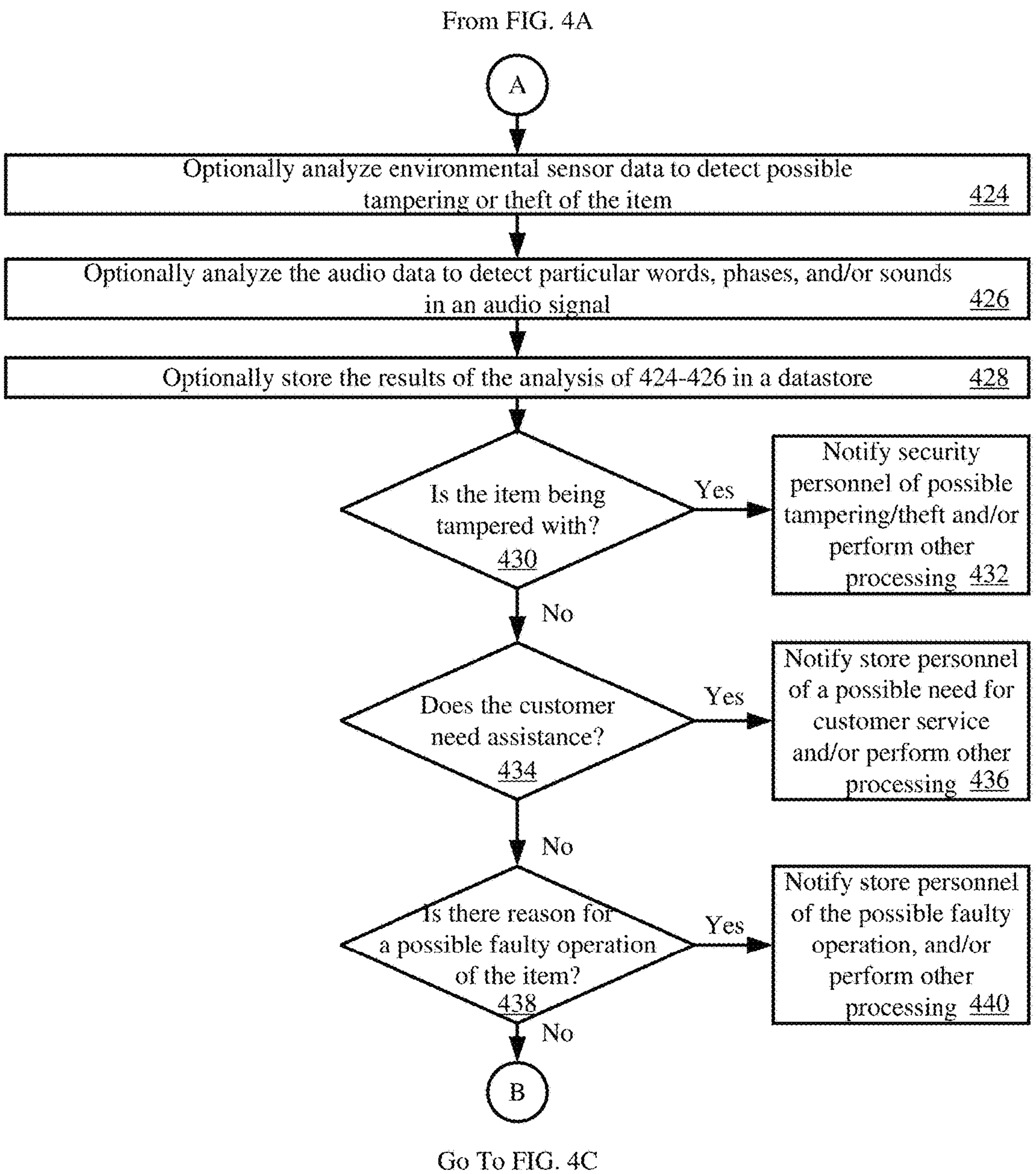

Upon completing 422, method 400 continues with 424 of FIG. 4B. 424 involves optionally analyzing environmental sensor data to detect possible tampering or theft of the item. For example, the analysis involves determining: if the amount of light around the EST has decreased a certain amount thereby indicating that the item is being placed in a bag; an amount of fluid around the EST has increased by a certain amount thereby indicating that the item is being placed in a container of fluid for purposes of disabling the EST; and/or if the temperature around the EST has increased by a certain amount indicating that the EST is being subjected to heat for purposes of damaging the same.

In a next 426, the audio data is optionally analyzed to detect particular words, phrases, and/or sounds in an audio signal. Techniques for voice, speech and sound detection are well known in the art, and therefore will not be described herein. Any known or to be known technique for voice, speech and sound can be used herein without limitation. For example, the audio data is processed to detect words and/or phrases that are useful for understanding a person's intent with regard to the item to which the EST is coupled, the person's interest in the item, and/or the person's need for additional information about the item (e.g., does the person have item related questions which can be answered by a store employee). The present solution is not limited to the particulars of this example. The results of this analysis are optionally stored in a datastore (e.g., database 114 of FIG. 1 and/or memory 208 of FIG. 2) as shown by 428. In some scenarios, at least one symbol is stored in the datastore indicating the results of the data analysis. The symbol can include at least one numerical symbol, at least one alphabetic symbol and/or graphical symbol.

Subsequently, a number of decisions are made in 430-450 based on the results of the data analysis. In 430, a decision is made as to whether or not the item is being tampered with. This decision is made based at least on the results of the motion data analysis, environmental data analysis, and/or audio data analysis. For example, a decision that tampering is occurring is made when the item's location is being changed rapidly (indicating running), the item is being carried towards an exit, the item is being placed in a bag, the item is being placed in a fluid, the item is being subjected to heat, the item has been slammed against a surface, and/or a particular word/phrase was spoken by the person handling the item. The present solution is not limited to the particulars of this example.

If tampering is occurring [430:YES], then 432 is performed where security personnel is notified of the possible tampering. This notification can include information specifying the location of the EST in the facility, the direction of travel of the EST through the facility, the speed of travel of the EST through the facility, and/or the reason a decision was made that there is possible tampering (e.g., rapid movement, reduction in light, increase in heat, and/or increase in moisture). Additionally or alternatively, other processing can be performed in 432 (e.g., method 400 ends and/or method 400 returns to 408). In some scenarios, this notification includes information specifying the location of the EST in the facility.

If tampering is not occurring [430:NO], 434 is performed where a decision is made as to whether or not a customer needs assistance (e.g., does the customer have item related questions which can be answered by a store employee as evidenced by the amount of time the person has been viewing the item or a phrase spoken by the person while handling the item). This decision is made based at least on the results of the motion data analysis and/or audio data analysis. For example, a decision is made that customer service is needed when a particular phrase is spoken by the person handling the item and/or a certain amount of time has passed since the person began handling the item. The present solution is not limited to the particulars of this example.

If customer service is needed [434:YES], 436 is performed where store personnel is notified of a possible need for customer service in association with a particular item made accessible in the facility. In some scenarios, this notification includes information specifying the location of the EST in the facility and/or a recommendation as to what customer service that should be provided (e.g., answer questions with regard to a particular topic, the provision of promotional materials, etc.). Additionally or alternatively, other processing can be performed in 436 (e.g., method 400 ends and/or method 400 returns to 408).

If customer service is not needed [434:NO], 438 is performed where a decision is made as to whether there is a reason for a possible faulty operation of the item. This decision is made based at least on the results of the motion data analysis. For example, if the motion data analysis indicates that the EST has been dropped or slammed, then a decision is made that there is a reason for faulty operation of the item. If there is a reason for future faulty operation of the item [438:YES], 440 is performed where store personnel is notified about the possible faulty operation. Additionally or alternatively, other processing can be performed in 440 (e.g., method 400 ends and/or method 400 returns to 408).

Figure 4C:
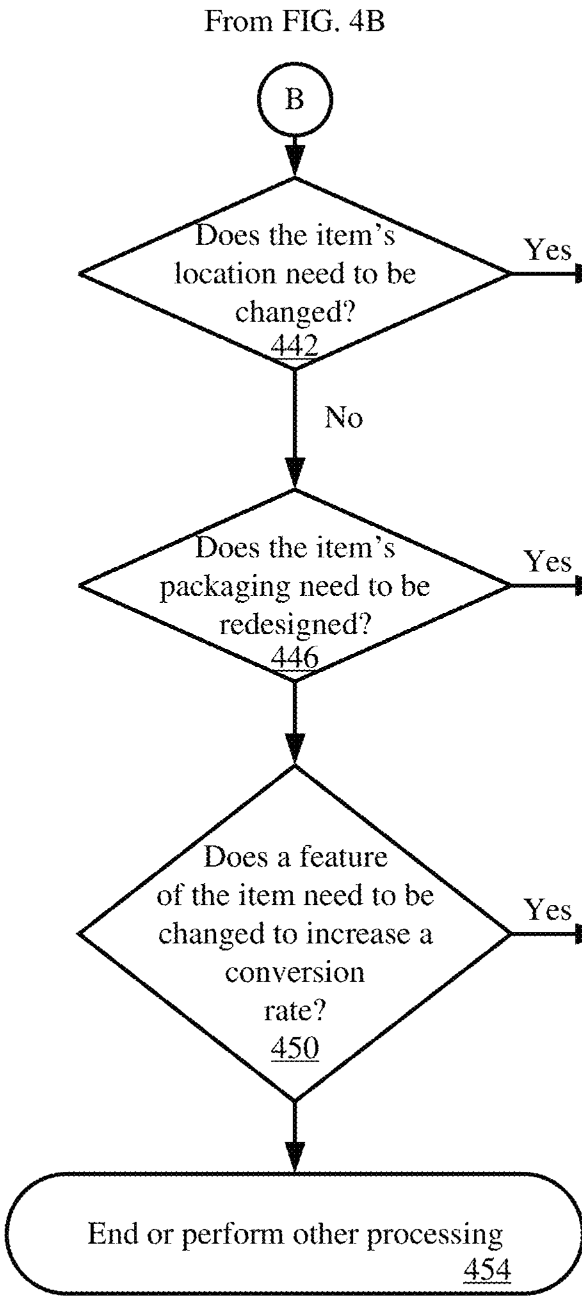

In contrast, if there is not a reason for faulty operation [438:NO], then method 400 continues with 442 of FIG. 4C. 442 involves making a decision as to whether the item's location needs to be changed. This decision is made based at least on the results of the motion data analysis and/or collected information indicating a conversion rate (e.g., number of sales) for items of the same type as that of the item to which the EST is coupled. For example, a decision is made that the item's displayed location in the facility should be changed so as to increase the sales of such items. The present solution is not limited to the particulars of this example.

If a decision is made that the item's location needs to be changed [442:YES], 444 is performed where a recommendation is provided to store personnel for relocating the item and/or item display within the facility (e.g., the item display closer to the front of the facility). Additionally or alternatively, other processing can be performed in 444 (e.g., method 400 ends and/or method 400 returns to 408).

In contrast if a decision is made that the item's location does not need to be changed [442:NO], 446 is performed where a decision is made as to whether the item's packaging needs to be redesigned. This decision is made based at least on the results of the motion data analysis and/or the audio data analysis. For example, a decision is made that the item's packaging needs to be redesigned to include additional information when a number of people have handled the item for relatively long periods of time and/or have needed customer service (e.g., needed the same or similar questions answered by store personnel). The present solution is not limited to the particulars of this example.

If a decision is made that the item's packaging needs to be redesigned [446:YES], 448 is performed where a recommendation is provided to store personnel for a redesign of the item's packaging. This recommendation may be derived based at least on the results of the motion data analysis and/or the audio data analysis. For example, a recommendation is made that additional information should be printed on the item's packaging that relates to a particular topic (e.g., a topic selected based on the question(s) answered by store personnel). The present solution is not limited to the particulars of this example. Additionally or alternatively, other processing can be performed in 448 (e.g., method 400 ends and/or method 400 returns to 408).

In contrast, if a decision is made that the item's packaging does not need to be redesigned [446:NO], 450 is performed where a decision is made as to whether a feature of the item needs to be changed to increase the conversion rate associated therewith. This decision is made based at least on the results of the motions data analysis and/or the audio data analysis. For example, a decision is made that the item's color should be changed based on a particular word/phrase spoken by at least one person who handled the item. The present solution is not limited to the particulars of this example.

If a decision is made that a feature of the item should be changed [450:YES], 452 is performed where a recommendation is made to store personnel for improving the item's feature(s). This recommendation is made based at least one the results of the motions data analysis and/or the audio data analysis. For example, a recommendation is made to change the items overall look and feel (e.g., color) when a particular word/phrase spoken by at least one person who handled the item. The present solution is not limited to the particulars of this example. Additionally or alternatively, other processing can be performed in 452 (e.g., method 400 ends and/or method 400 returns to 408). In contrast, of a decision is made that a feature of the item should not be changed [450:NO], 454 is performed where method 400 ends or other processing is performed.

Figure 5:
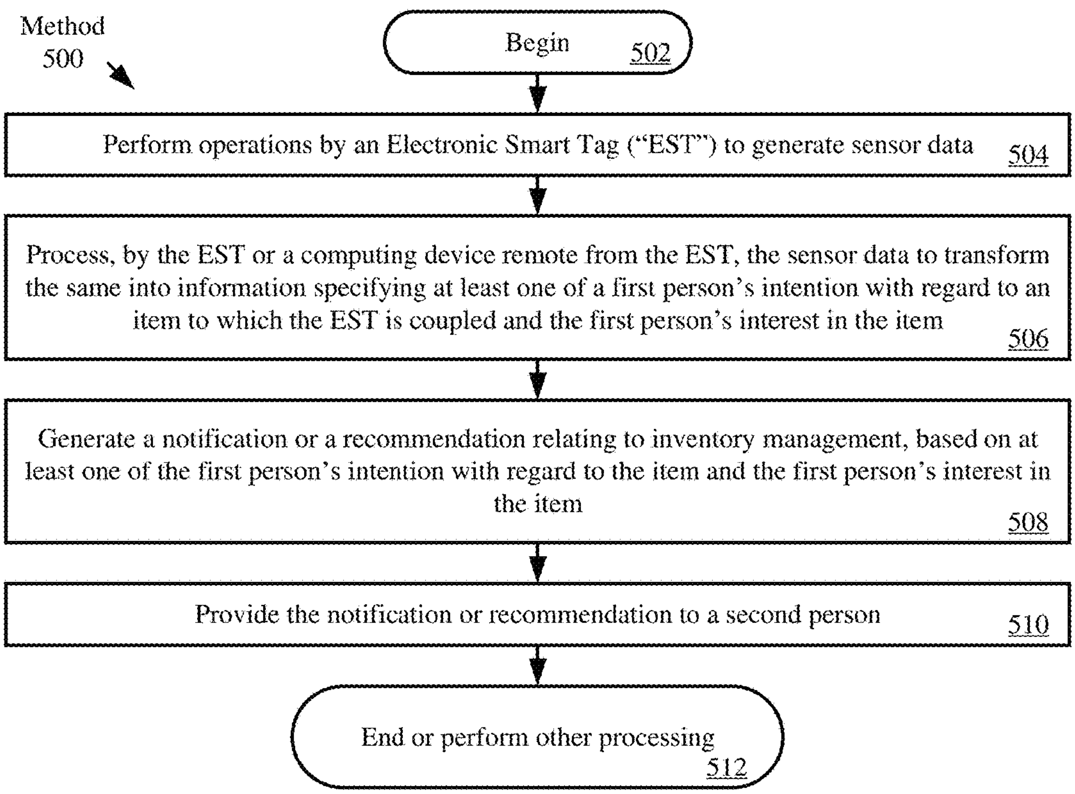
FIG. 5 provides a flow diagram of an exemplary method for inventory management.

Referring now to FIG. 5, there is provided a flow diagram of an exemplary method 500 for inventory management. Method 500 begins with step 502 and continues with step 504 where an EST (e.g., EST 120 of FIG. 1 and/or EST 200 of FIG. 2) performs operations to generate sensor data. The sensor data specifies at least one of the EST's movement, a surrounding environment's characteristic, and audio content of the surrounding environment. The surrounding environment's characteristic comprises light, moisture or heat. The audio content comprises at least one of speech and sound.

The sensor data is processed in 506 by the EST or a computing device (e.g., computing device 112 of FIG. 1 and/or computing device 300 of FIG. 1) remote from the EST. The sensor data is processed to transform the same into information specifying at least one of a first person's (e.g., a customer's) intention with regard to an item to which the EST is coupled and the first person's interest in the item. The first person's intention comprises tampering, steeling or purchasing. The first person's interest includes learning more about a particular feature of the item (e.g., a data input/output port and/or a power source). For example, the raw sensor data is transformed into a symbol specifying at least one of a first person's intention with regard to an item to which the EST is coupled and the first person's interest in the item. The symbol comprises, but is not limited to, at least one numerical character, at least one alphabetic character, and/or at least one graphic. The present solution is not limited to the particulars of this example.

Thereafter, in 508, a notification or a recommendation is generated that relates to inventory management. This notification or recommendation generation is based on at least one of the first person's intention with regard to the item and the first person's interest in the item. The notification or recommendation is provided to a second person (e.g., an employee) in 510. In some scenarios, the notification comprises a notification of a possible tampering or theft, a notification of a possible need for customer service, and a notification of a possible faulty operation of the item. The recommendation comprises a recommendation for relocating the item, a redesign of the item's packaging or an improvement of a feature of the item. Subsequently, 512 is performed where method 500 ends or other processing is performed.

In view of the forgoing, the present solution concerns ESTs for use on merchandise that may or may not have EAS functionality build in. The ESTs do have motion sensors and environmental sensors (e.g., light sensors) to detect tag movement and measure the general environment around the tag. These sensors are used to detect customers interacting with the merchandise, to gather data to inform store personnel about how the merchandise is handled, and to indicate the environment around the merchandise. For instance, an audio sensor could indicate excitement near the merchandise or anger indicating some issue in the area.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for managing inventory, comprising:

generating sensor data indicating at least one measured physical property by an internal sensor device of an Electronic Smart Tag ("EST");

processing, by the EST or a computing device remote from the EST, the sensor data to transform the same into information specifying at least one of a first person's intention with regard to an item to which the EST is coupled and the first person's interest in the item;

generating a recommendation relating to inventory management, based on the information specifying at least one of the first person's intention with regard to the item and the first person's interest in the item, where the recommendation is for improving (a) the item's packaging, (b) a characteristic of the item or (c) the item's display location within a facility; and providing the recommendation to a second person.

2. The method according to claim 1, wherein the sensor data specifies at least one of the EST's movement and audio content of the surrounding environment.

3. The method according to claim 2, wherein the audio content comprises at least one of speech and sound.

4. The method according to claim 1, wherein the sensor data comprises a surrounding environment's characteristic.

5. The method according to claim 1, wherein the first person is a customer and the second person is an employee.

6. The method according to claim 1, wherein the first person's intention comprises purchasing.

7. A Electronic Smart Tag ("EST") couplable to an inventory item, comprising:

at least one sensor device generating sensor data indicating at least one measured physical property;

a processor;

a non-transitory computer-readable storage medium comprising programming instructions that are configured to cause the processor to implement a method for inventory management, wherein the programming instructions comprise instructions to:

process the sensor data to transform the same into information specifying at least one of a first person's intention with regard to the inventory item to which the EST is coupled and the first person's interest in the inventory item;

cause a recommendation relating to inventory management to be generated based on the information specifying at least one of the first person's intention with regard to the inventory item and the first person's interest in the inventory item; and cause the recommendation to be provided to a second person;

wherein the recommendation is for improving the item's packaging, a characteristic of the item or the item's display location within a facility.

8. The EST according to claim 7, wherein the sensor data specifies at least one of the EST's movement and audio content of the surrounding environment.

9. A system, comprising:

an Electronic Smart Tag ("EST") coupled to an inventory item and comprising at least one internal sensor device configured to generate sensor data indicating at least one measured physical property; and a computing device remote from the EST that has a non-transitory computer-readable storage medium comprising programming instructions that are configured to cause the computing device to implement a method for inventory management, wherein the programming instructions comprise instructions to:

obtain the sensor data from the EST;

process the sensor data to transform the same into information specifying at least one of a first person's intention with regard to an item to which the EST is coupled and the first person's interest in the item;

generate a recommendation relating to inventory management, based on the information specifying at least one of the first person's intention with regard to the item and the first person's interest in the item; and cause a provision of the recommendation to a second person;

wherein the recommendation is for improving the item's packaging, a characteristic of the item or the item's display location within a facility.

10. The system according to claim 9, wherein the sensor data specifies at least one of the EST's movement and audio content of the surrounding environment.

11. The system according to claim 10, wherein the audio content comprises at least one of speech and sound.

12. The system according to claim 9, wherein the sensor data comprising a surrounding environment's characteristic.

13. The system according to claim 9, wherein the first person is a customer and the second person is an employee.

14. The system according to claim 9, wherein the first person's intention comprises purchasing.

* * * * *